Nov. 3, 1959     L. R. HEIM     2,910,765
METHOD OF MAKING ANTIFRICTION BEARINGS
Original Filed April 6, 1955     4 Sheets-Sheet 2
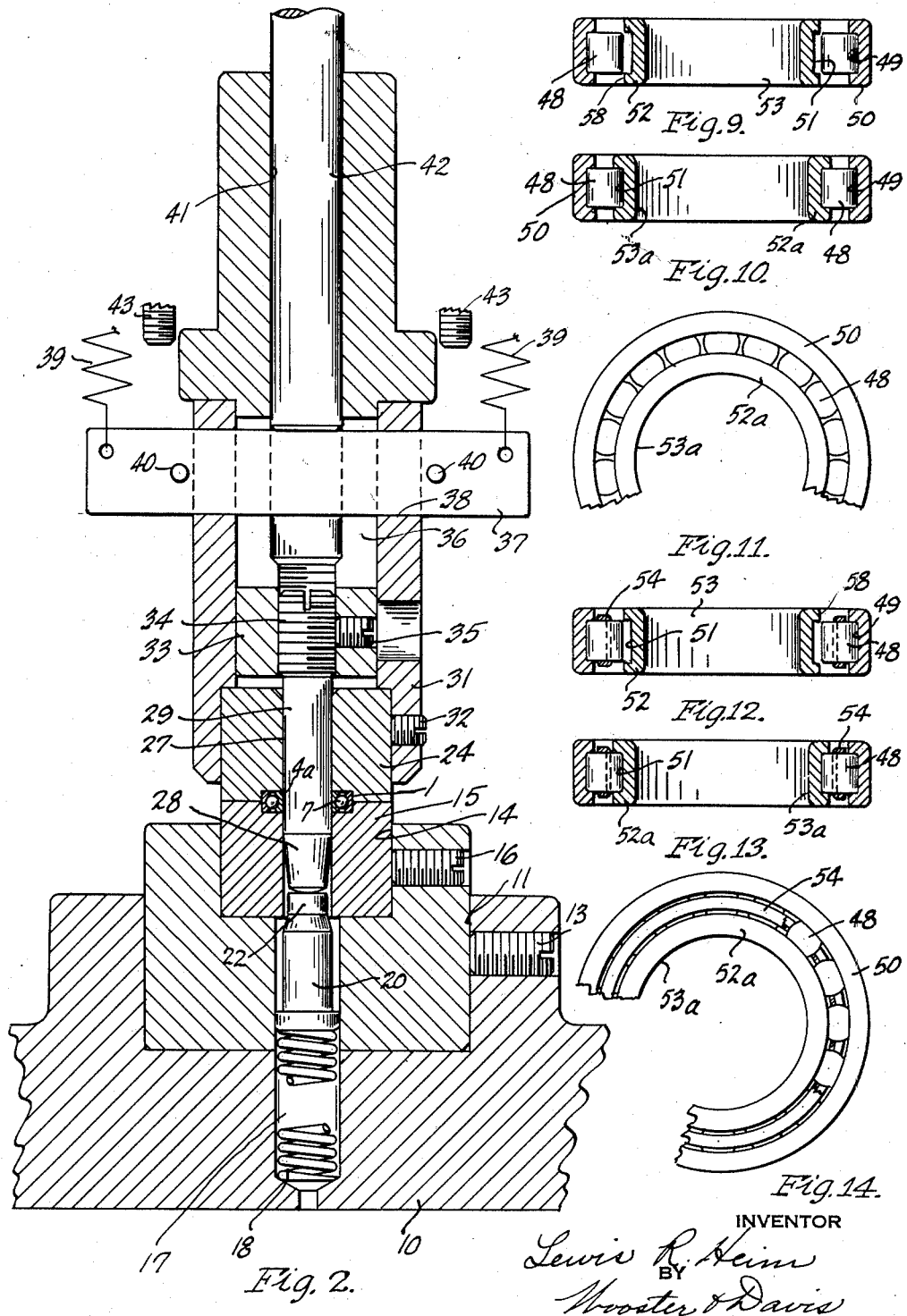
INVENTOR
Lewis R. Heim
BY
Wooster & Davis
ATTORNEYS.

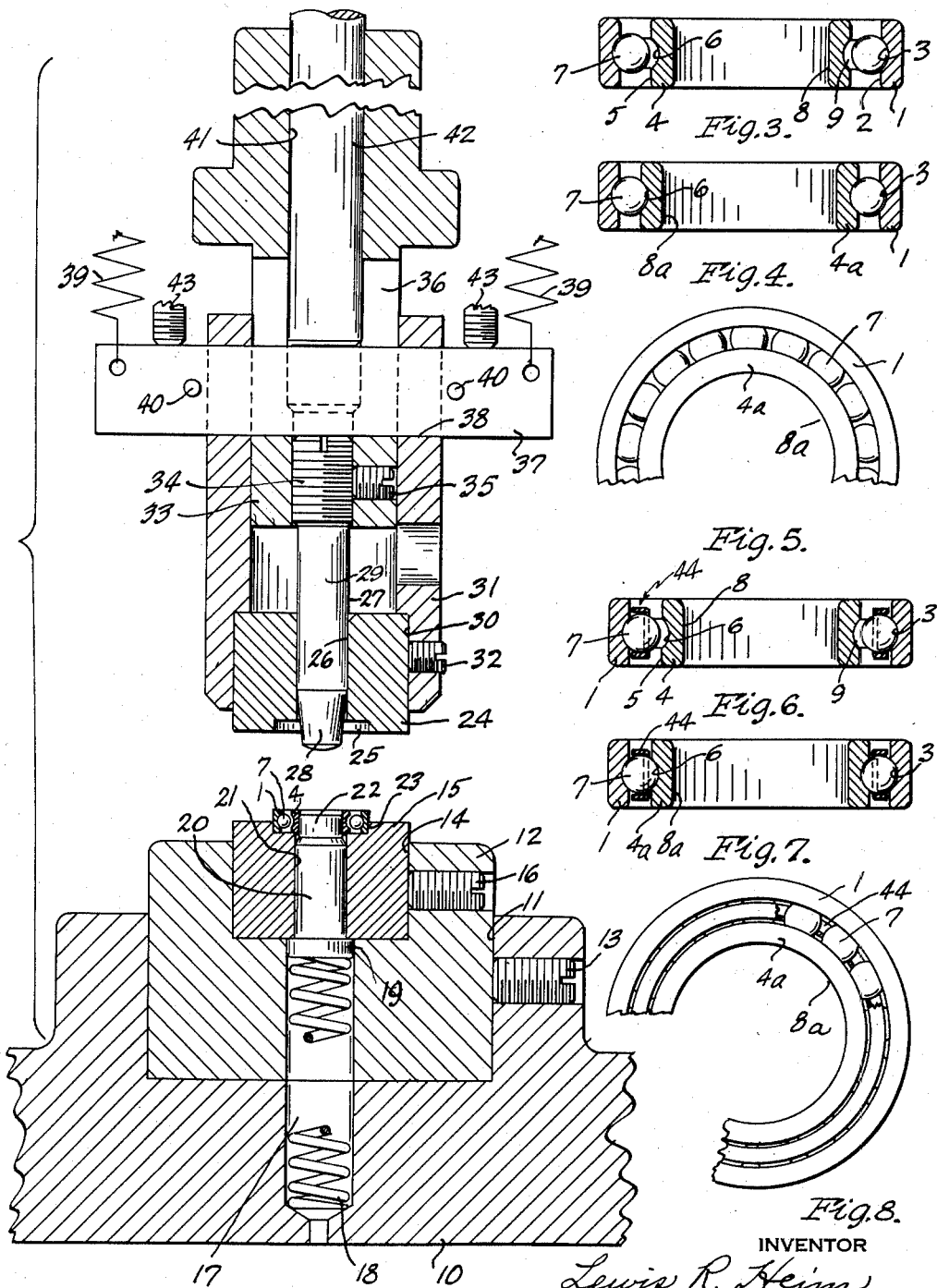

Nov. 3, 1959
L. R. HEIM
2,910,765
METHOD OF MAKING ANTIFRICTION BEARINGS
Original Filed April 6, 1955
4 Sheets-Sheet 3
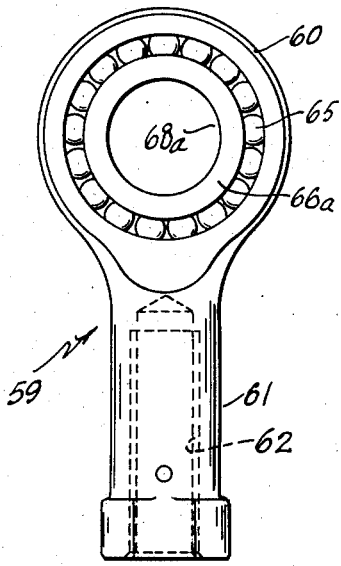
Fig. 15.
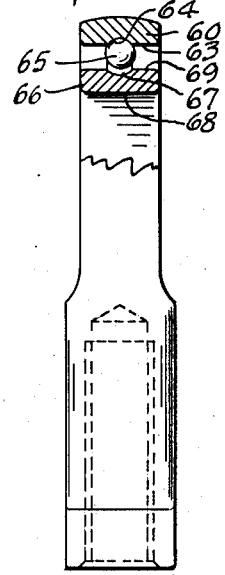
Fig. 16.
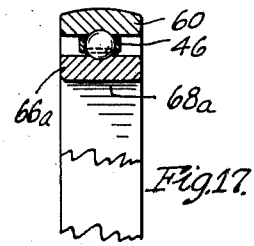
Fig. 17.
Fig. 18.
Fig. 19.
Fig. 20.
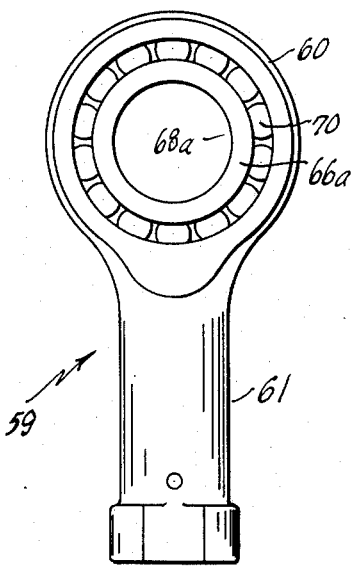
Fig. 21.
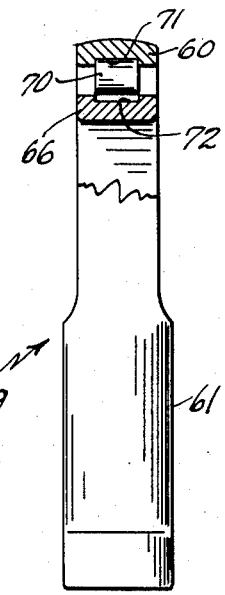
Fig. 22.
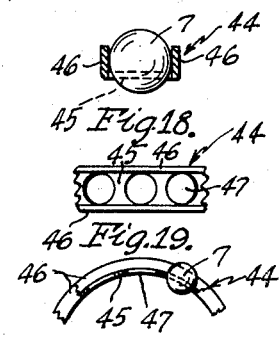
Fig. 23.
Fig. 24.
Fig. 25.
Fig. 26.
INVENTOR
Lewis R. Heim
BY
Wooster & Davis
ATTORNEYS.

Nov. 3, 1959     L. R. HEIM     2,910,765
METHOD OF MAKING ANTIFRICTION BEARINGS
Original Filed April 6, 1955     4 Sheets-Sheet 4

INVENTOR
Lewis R. Heim
BY Wooster & Davis
ATTORNEYS.

United States Patent Office 2,910,765
Patented Nov. 3, 1959

2,910,765
METHOD OF MAKING ANTIFRICTION BEARINGS

Lewis R. Heim, Fairfield, Conn., assignor, by mesne assignments, to Channing Corporation, New York, N.Y., a corporation of California Continuation of abandoned application Serial No. 499,688, April 6, 1955. This application August 19, 1958, Serial No. 756,500

11 Claims. (Cl. 29—148.4)

This application is a continuation of my application Serial No. 499,688, filed April 6, 1955, for "Method of Making Antifriction Bearings," now abandoned.

This invention relates to antifriction bearings, and more particularly to a novel method of making and assembling antifriction bearings, either of the ball or roller type, and either of the fixed axis or self-aligning type; and has for an object to provide an improved and effective means and method of making and assembling antifriction bearings, including a series of antifriction rolling elements either in the form of balls or rollers, and using them either with or without a cage or separator.

Another object is to provide an improved method of making and assembling antifriction bearings in which an inner rotatable member having a raceway in its outer wall is assembled with an outer member having an inner raceway with the antifriction rolling elements placed in the opposed raceways, and then the inner member is expanded to bring its raceway into bearing relation with the rolling elements, and this inner member is brought into interlocking relation with the outer member for bearing contact and movement of the rolling elements.

A further object is to provide a method of assembling antifriction bearings in which a bearing with unbroken raceways may be assembled with its full complement or quota of the rolling elements, either balls or rollers, that is, all the rolling elements the raceways will hold with slight permissible clearance between them. It is therefore also an object to produce the improved bearing which will thus be formed by this method.

A still further object is to provide a method of making and assembling antifriction bearings in which a cage or separator for the rolling elements, either the balls or rollers, can be made in one integral piece.

With the foregoing and other objects in view, I have devised the novel method with means by which it may be accomplished as illustrated in the accompanying drawings forming a part of this specification. It is, however, to be understood the invention is not limited to the specific details shown or described, but may embody various changes and modifications within the scope of the invention.

In these drawings:

Fig. 1 is a vertical section through a set of dies which may be used in a power press, showing the operation thereof for carrying out this method, the movable die being shown in the raised or open position preparatory to performing the expanding operation;

Fig. 2 is a sectional view showing the dies closed, or the upper die in the lower position, and the parts in the position they occupy after operating on the bearing to perform the expanding operation;

Fig. 3 is a sectional view through a standard type of ball bearing indicating the first steps in performing the method of assembling and completing this bearing;

Fig. 4 is a similar view showing the bearing completed;

Fig. 5 is a side view looking toward the bottom of Fig. 4;

Fig. 6 is a sectional view similar to Fig. 3 showing the use of a one-piece cage or separator for positioning the balls of the bearing and showing the elements preparatory to performing the expanding operation;

Fig. 7 is a similar section showing the arrangement of the elements after the expanding operation to complete the bearing;

Fig. 8 is a side view looking toward the bottom of Fig. 7;

Fig. 9 is a section similar to Figs. 3 and 6 showing the elements arranged preparatory to the expanding operation, but using a series of rollers instead of the balls as shown in Figs. 3 to 8;

Fig. 10 is a similar section showing the inner member expanded to complete the bearing;

Fig. 11 is a side view looking toward the bottom of Fig. 10;

Fig. 12 is a sectional view similar to Fig. 9 showing a modification in which a one-piece cage or separator is used for the rollers;

Fig. 13 is a similar section showing the inner member expanded to complete the bearing;

Fig. 14 is a side view looking toward the bottom of Fig. 13;

Fig. 15 is a side view showing a bearing mounted by this method in a rod end or similar member;

Fig. 16 is a partial side view and partial section indicating how a ball type of bearing is assembled in this rod end preparatory to the expanding operation to complete the assembly of the bearing;

Fig. 17 is a section of the upper portion of this rod end showing the completed bearing using a cage or separator for the balls;

Fig. 18 is a section on a larger scale through the cage or separator and indicating how the balls are placed therein;

Fig. 19 is a top plan or outer edge view of a portion of this cage;

Fig. 20 is a partial side view and partial peripheral section of this separator with one of the balls in place;

Fig. 21 is a view similar to Fig. 15 showing the use of rollers in the rod end bearing in place of the balls;

Fig. 22 is a partial side view and partial section of the bearing assembled in this rod end preparatory to performing the expanding operation;

Fig. 23 is a section of a portion of this rod end showing the assembled bearing but using a cage or separator for the rollers;

Fig. 24 is a transverse section of the cage on a larger scale with one of the rollers in place;

Fig. 25 is a plan or outer edge view of a portion of the cage or separator;

Fig. 26 is a partial side view and partial peripheral section of the separator of Figs. 23 to 25 and showing one of the rollers in place;

Figure 27:
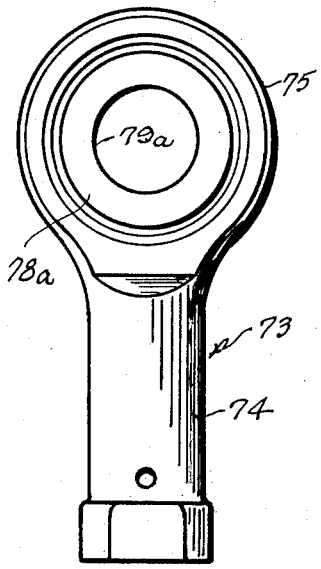
Fig. 27 is a side view of a bearing of the self-aligning type assembled by this method in a rod end or similar machine element.

In carrying out this improved method of making and assembling antifriction bearings, an outer bearing member of suitable material, preferably a suitable metal, such, for example, as steel, which may or may not be heat-treatable or hardenable, is provided with a circular hole or opening therethrough, and an outer raceway in the form of a peripheral groove is formed in the wall of this opening. An inner circular or cylindrical bearing member is formed of ductile material, preferably a suitable metal, such, for example, as steel which may or may not be heat-treatable or hardenable, and which may or may not be formed with a hole or opening therethrough, is provided with a peripheral raceway groove in its outer surface for alignment with the groove or raceway of the outer bearing member, and a series of antifriction rolling elements, which may be either balls or rollers, such as cylindrical, tapered, convex or concave rollers, are placed intermediate these raceways, the inner bearing member being of sufficiently less diameter than the outer member that it may be inserted within the rolling elements after they are assembled in the raceway in the outer member, and then the inner bearing member is expanded to bring the raceway in its outer wall into engagement with the balls or rollers in the raceway in the wall of the opening in the outer member to cause proper running fit between the rolling elements and the two raceways in the bearing members, this expanding operation of the inner member also interlocking the inner member with the outer member through or by means of the rolling elements, either the balls or the rollers, having running bearing fit in the two aligned raceways. This expanding operation of the inner member completes the assembly of the elements of the bearing after they have been placed in proper relative positions with respect to each other. This expanding operation of the inner member may be performed by different means, but an effective means for rapidly performing this operation accurately and quickly with accurate control is shown in Figs. 1 and 2.

Examples of bearings which may be formed and assembled by this method are shown in Figs. 3 to 35. In Figs. 3, 4 and 5 there is shown a standard type of antifriction bearing using a series of balls as the rolling antifriction elements, this bearing comprising an outer ring-shaped bearing member 1 provided with a transverse hole or opening 2 therethrough in the wall of which is provided a peripheral raceway groove 3. The inner bearing member 4, in this case also in the form of a ring, is made of ductile material and has a cylindrical outer surface 5 in which is formed a peripheral inner raceway groove 6 complementary to that of the raceway 3, and a series of antifriction rolling elements in the form of balls 7 are mounted to run in these raceways. The inner bearing member 4 has a longitudinal hole or opening 8 therethrough. In assembling this bearing by this method the inner bearing member 4 is made with an outer diameter substantially that of or slightly less than the diameter of a circle through the inner sides of the balls 7 when these balls are seated in the outer raceway 3, or that is, the outer diameter of the inner bearing member is less than the diameter of the raceway in the outer bearing member by an amount at least twice that of the diameter of the balls, so that this inner member can be inserted laterally from one side of the bearing to a position within these balls, as indicated in Fig. 3, and it will be seen that in this position the inner raceway 6 is spaced from the balls, as indicated at 9. In completing the assembly of the bearing, the inner bearing member 4 is expanded as indicated in Fig. 4 so as to bring its raceway 6 into running fit or bearing relation to the balls 7 in the outer raceway 3. This expanding operation of the inner bearing member can be accurately controlled to produce the proper bearing or running fit between the rolling elements, in this case the balls 7, and the raceways of the two bearing members 1 and 4. This operation also provides an interlocking relation or connection between the inner bearing member 4 and the outer bearing member 1 through these rolling elements or balls for proper bearing relation and relative rotation between the two members. After the elements are assembled, if they are made of heat-treatable or hardenable material, they may be heat-treated and hardened and the outer side surfaces accurately ground to size and finish, as well as the surface of the enlarged opening 8a in the expanded inner member. Both or either one of the bearing members may or may not be made of hardenable or heat-treatable material, such, for example, as suitable heat-treatable steel, and after the bearing is completed it may be used on shafts or other locations in machines or machine elements the same as any standard antifriction bearing.

Different means may be used for expanding the inner bearing member to complete the assembly, but the preferred is to force through the opening 8 in the inner bearing member a punch having a sufficiently larger diameter than this opening to secure the desired expansion, this punch having a tapered end portion leading to a straight or cylindrical land surface of the proper diameter. With such a punch the expanding operation may not only be quickly performed but it can be readily and accurately controlled. A die set and means for operation of such a punch is shown in Figs. 1 and 2.

The die set is shown adapted for mounting in a suitable power press (not shown) for operation thereby, and comprises a die shoe 10 provided with a recess 11 in which is seated the lower die block 12, and which may be held in place by a set screw 13. This die block is provided with a recess or socket 14 in which is seated a lower die 15 which may be locked in place by a set screw 16. The shoe and block 10 and 12 are provided with a vertical opening 17 in which is a coil spring 18 pressing at its upper end against the under side of the head 19 of a slidable pilot 20, the head 19 being in the opening in the block 12 and its body portion in an opening 21 in the die 15. The upper end portion of this pilot is reduced in diameter as indicated at 22, and in the top of the die 15 is formed a recess 23, the opening 21 leading to the bottom of this recess. This recess is of a diameter to receive the outer bearing member 1 of the bearing to be assembled, and of a depth of approximately one-half the width of this member.

The upper die in this mounting comprises the die 24 similar to and over the die 15, and having in its lower end a circular recess 25 of substantially the same size and depth as the recess 23 in the lower die, and in alignment therewith. This die has a passage or opening 26 therethrough in which is slidably mounted a punch 27 having a tapered and reduced lower end portion 28 extending into the socket or recess 25 and leading to a straight land or cylindrical body portion 29. This die 24 is mounted in a socket or recess 30 in the lower end of a hollow sleeve 31, and may be secured by a set screw 32. Mounted for limited longitudinal sliding movement in the sleeve 31 is a cylindrical block 33 forming a carrier for the punch 27, this punch having an enlarged threaded upper end 34 screw threaded into the lower end of the block 33 for longitudinal adjustment therein, and it may be secured in adjusted positions by a set screw 35. This block 33 is provided with a transverse elongated slot 36 extending therethrough in which is slidable a flat bar 27 projecting at its opposite ends through openings 38 in the sides of the sleeve 31, and springs 39 connected to this bar tend to lift it and the sleeve 31. Transverse pins 40 may be mounted in the bar 37 to keep it centered in the sleeve 31. The block 33 is provided with a longitudinal passage 41 in which is a plunger rod 42 normally engaging at its lower end on top of the bar 37. Adjustable set screws 43 mounted in the press form limit stops to limit the upward movement of the bar 37 and the elements connected therewith, as will later be described.

In carrying out this novel method of forming and assembling an antifriction bearing illustrated in Figs. 3 to 5, the outer bearing member 1 with its longitudinal opening 2 and raceway 3 is seated in the recess 23 in the lower die 15, with the balls 7 in the raceway and the inner bearing member 4 of reduced diameter placed within the balls, as shown in Figs. 1 and 3, with its raceway 6 in alignment with the row of balls and therefore the raceway 3, and having the reduced end 22 of the pilot in the opening 8 therethrough and by which it is properly centered. Or if preferred the balls may be placed in the inner raceway 6 and inserted in the outer member 1 with the inner member 4. This inner bearing member 4 is expanded into the position of Fig. 4 to secure proper running or bearing fit between the balls and the two opposed raceways in the two outer and inner bearing members. In the operation shown this inner bearing member 4 is expanded by forcing the punch 27 through the opening 8, the punch being of sufficiently larger diameter than this opening to secure the proper expansion of the inner bearing member desired. In this operation of expanding the inner bearing member 4, the plain bearing opening 8 therein is also expanded to a larger diameter 8a, as shown in Fig. 4.

In the operation of carrying out this method in the die set shown in Figs. 1 and 2, after the two bearing members 1 and 4 with the balls 7 are placed in the recess in the lower die 15, and the inner reduced or smaller bearing member 4 is centered by means of the upper end portion 22 of the pilot 20 (which end portion 22 is of the same size as the reduced opening 8), the pilot 20 being held in this upper position by the spring 18, the upper die 24 and the plunger are lowered to complete the expanding operation of the reduced inner bearing member 4. The recess 23 in the lower die and the pilot 20 properly center the elements of the bearing with respect to the recess 25 in the upper die and the plunger 27 and hold them in the centered and upright position in alignment with them for the expanding operation. When the upper die and punch are lowered against these members, as indicated in Fig. 2, in this operation all of the members, including the die 24, punch 27, sleeve 31, block 33, bar 37 and plunger 42, move downwardly together under action of the power press, until the lower end of the die 24 rests on top of the lower die 15, as shown in Fig. 2. This arrests downward movement of the die 24, sleeve 31, bar 37 and plunger 42, and the bearing is located and held in the two aligned recesses 23 and 25 of the dies. Then the block 33 and the punch 27 continue to move downwardly, forcing the tapered lower end 28 of the punch through the opening 8 in the inner bearing member 4, and the punch is carried far enough to pass the tapered end portion 28 through the inner bearing member 4, and until its cylindrical or straight land body portion 29 also passes into and through the inner bearing member 4, as indicated in Fig. 2, the punch in this movement forcing the pilot 20 downwardly out of the opening in the bearing member 4. As the body 29 of the punch 27 is of larger diameter than the hole or opening 8 in the bearing member 4 it will expand this member to the position of Figs. 2 and 4, causing the inner raceway 6 in the inner bearing member to closely fit the balls 7 when located in the outer raceway 3, and the relative sizes can be so proportioned that at the end of this expanding operation the expanded inner bearing member 4a has good bearing fit with the balls 7, or stated in another way, the balls have a good running or bearing fit in the two opposed raceways 3 and 6. This operation also interlocks the inner bearing member 4a with the outer bearing member 1 through or by these balls. This expanding operation also expands or increases the diameter of the opening 8 in the inner bearing member to a larger size, as indicated at 8a in Fig. 4, and it can at the same time finish and size this enlarged opening for proper fit on a shaft or other member with which the bearing is to be used. The assembly of the bearing is now complete.

After this expanding and sizing operation is completed, the entire upper die assembly moves upwardly to the predetermined stops 43 carrying the assembled bearing with it. The stops 43, as above indicated, may be comprised of adjustable set screws in the frame of the press, and these screws or stops engage the bar 37 while the die set is moving upwardly, thus stopping and holding the bar 37, sleeve 31, and die 24 against further upward movement. Block 33 and punch 27 continue their upward movement, thus stripping the bearing from the punch 27, after which block 33 and punch 27 continue their upward movement until the full upper position is attained, as shown in Fig. 1, in preparation for the next sizing and expanding operation. At the termination of the stripping operation the completed and assembled bearing may be removed from the operating area.

It will be seen, as indicated, that the expanding of the innner bearing member 4 by forcing the enlarged punch therethrough will increase the diameter of the plain bearing hole or opening 8 through this member, as indicated at 8a in Fig. 4, and this plain bearing hole or opening through the inner member can be accurately formed to the desired size for the member with which the bearing is to be used, by this action of the punch.

This bearing may be used as formed, or it may be heat-treated or not, as desired. The whole bearing may be heat-treated if desired, or if it is desired to heat-treat and harden either bearing member without correspondingly hardening the other, either one may be formed of nonhardenable or less hardenable material while the other is formed of hardenable material. As the outer bearing member 1 is not changed in this assembling operation, it may be heat-treated and hardened and then accurately ground to size before the balls and the inner member are assembled therein, the inner member being formed of suitable ductile material so that it may be expanded and sized in the expanding assembling operations.

Other examples of bearings which may be made and assembled by this method are shown in Figs. 6 to 26. In Figs. 6 to 8, the same type of bearing as that of Figs. 3 to 5 is shown, except that instead of the balls 7 being free, as indicated in Figs. 3 to 5, a cage or separator is used to properly position these balls in the raceways, and maintain them in these positions during use of the completed bearing. Any suitable type of cage or separator may be used, but as the bearing is assembled and completed by expanding the inner bearing member 4, this permits the use of a continuous one-piece cage or separator which is not possible with the ordinary assembling methods. A simple and effective one-piece cage or separator is shown at 44 as a circular ring of substantially U-shape or channel shape in cross section with the connecting or transverse portion 45 between the parallel sides 46, as shown in Figs. 18 and 20, provided with spaced holes or openings 47 in which the balls are located and by which they are properly spaced and located in the finished bearing. The balls are assembled in the cage and in the raceway in the outer bearing member, and then the inner bearing member placed in position and expanded to complete this bearing, in the same manner as described in connection with Figs. 3 to 5.

In Figs. 9 to 11 is shown a preformed bearing of the same construction and arrangement as that of Figs. 3 to 5, except that in this bearing, instead of spherical balls being used as the antifriction rolling elements, a series of cylindrical or circular rollers 48 are used. As the rollers shown are straight or cylindrical the raceways are correspondingly formed, but the rollers could be tapered, convex or concave and the raceways shaped to correspond. Thus the raceway 49 in the outer bearing member 50 and the inner raceway 51 in the inner bearing member 52 are channels with flat lower surfaces instead of being concave surfaces as are the raceways for the balls in the form of Figs. 3 to 8. Otherwise the bearing is the same and it is assembled by the same expanding operation of the inner bearing member as described in connection with Figs. 3 to 5. As in the other forms the straight bearing opening 53 through the inner member 52 will be enlarged by this expanding operation, as indicated at 53a.

In Figs. 12 to 14 the same type of bearing is shown as in Figs. 9 to 11, except that a circular cage or separator 54 is used for positioning and separating the rollers the same as is used for the balls in Figs. 6 to 8. This cage or separator, as shown more clearly in Figs. 24 to 26, is a one-piece ring of substantially U shape or channel shape in cross section, with the transverse connecting wall 55 extending between and connecting the parallel side walls 56 provided with substantially rectangular openings 57 to receive and retain the rollers 48. This separator or cage with the rollers in it is placed within the outer bearing member 50, as indicated in Fig. 12, and the reduced size inner bearing 52 also placed within the rollers as shown in Fig. 12, and then this inner bearing member is expanded as described in connection with the other forms, as shown in Fig. 13, to bring the raceways into good running relation with the rollers, and interlocking the inner bearing member with the outer bearing member through these rollers. It will be understood that in both forms of Figs. 9 to 11 and 12 to 14 the outer diameter 58 of the inner bearing member 52 before expanding will be of substantially the size of or slightly smaller than the circle in which the inner sides of the rollers are located when they are seated in the raceway 49 in the outer bearing member to permit this member to be inserted to the position of Figs. 9 and 12, preparatory to the expanding operation. That is, the outer diameter of inner member 52 is substantially that of or slightly less than the diameter of the raceway 49 minus twice the diameter of the rollers.

Figs. 15 to 17 and 21 to 23 indicate how this improved method may be employed to assemble the antifriction bearing, comprising either balls or rollers as antifriction rolling elements, in other machine elements instead of forming as a standard type of antifriction bearing comprising inner and outer raceway rings, as shown in Figs. 3 to 14. In Figs. 15 to 17 a rod end 59 is shown comprising a circular head 60 in substantially the form of an outer ring integral with which is a laterally extending tubular body portion 61 which may or may not be threaded at 62 for connection to a rod, cable or other member. The outer head portion 60 is provided with a hole or opening 63 therethrough in the wall of which is formed a raceway groove 64 to receive the antifriction elements, in this case the balls 65. The inner bearing member 66 employed therewith is a ring member the same as that shown at 4 in Figs. 3 to 8 and provided with the raceway groove 67 in its outer wall, corresponding to the raceway 6 in the first form. This inner member is provided with a transverse opening 68 therethrough and its outer diameter 69 is substantially the same as or slightly less than the circle in which the inner sides of the balls are located when assembled in the outer raceway 64 to permit insertion of the member 66 to the position shown in Fig. 16. Then the inner member 66 is expanded by forcing the proper size punch 27 through the opening 68 to expand this inner ring, as described in connection with Figs. 3 and 4, to provide the proper running bearing relation between the rolling elements and the inner and outer members.

Fig. 17 shows the bearing assembled as a result of the operations described in connection with Figs. 16 and 17 and the construction is the same except that the one-piece cage or separator 46 is used for properly positioning the balls, the same as shown in connection with Figs. 6 to 8.

Figs. 21 and 22 show the same construction of the element comprising the rod end 59, and the bearing mounted in it is the same as in Figs. 13 and 16 except instead of using the spherical balls 65 the cylindrical rollers 70 are used, and the raceway grooves 71 and 72 in the outer and inner members 62 and 66 are correspondingly straight, or that is, have straight bottom walls instead of the concave shape as shown in Fig. 16. When assembled as indicated in Fig. 22 the inner ring member 66 is expanded the same as in the other forms.

In Fig. 23 the elements are the same as in Fig. 22 and show them after expanding the inner ring 66 to the ring 66a, except that in this arrangement the rollers 70 are located in and positioned by the separator or cage 54.

Figure 28:
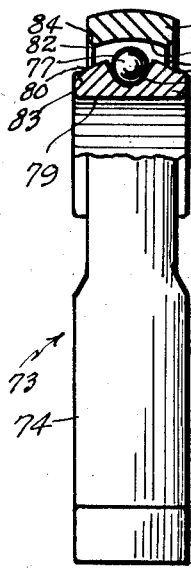
Fig. 28 is a partial side view and partial transverse section showing the parts of this bearing arranged for the expanding operation.
Figure 29:
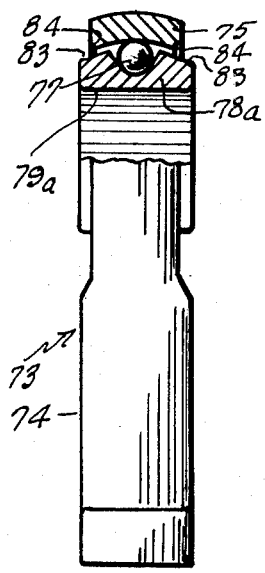
Fig. 29 is a similar partial side elevation and partial section showing the bearing completed after the expanding operation.

In Figs. 27 to 29 is shown a self-aligning type of antifriction bearing which may be assembled by this method in a rod end or similar machine element. In these figures the rod end is indicated at 73, including a stem 74 which may or may not be threaded for securing it to the end of a rod or cable or other element, and having a substantially circular head portion 75 through which is formed a transverse opening with a raceway 76 for the antifriction rolling elements, in this case the balls 77. In this opening is an inner bearing member 78 provided with a transverse bearing opening 79 and having an outer spherical surface 80. The outer raceway 76 in this case, instead of being a relatively narrow groove of substantially the width of the rolling elements or balls is a relatively wide, transversely curved groove extending substantially the full width of the outer member 75, and forms a part of the surface of a sphere struck about the center of the opening. The outer surface 80 of the inner member 78 is preferably struck from the same center so that these surfaces are substantially parallel. In the outer surface of the inner member 78 is formed an inner raceway in the form of an annular groove 81, which at its inner portion is of substantially the size and shape of the balls 77 so as to maintain the balls in alignment when formed, as shown in Fig. 28. This inner member 78 is of smaller diameter than when the bearing is completed and assembled. That is, its greatest outer diameter is sufficiently smaller than the diameter at the entrance 82 to the opening in the outer member that this member can be inserted in this opening in the outer member when the balls 77 are in the raceway 81 to the position of 28, and it will be seen that in this position the balls will be spaced from either the outer or inner raceway. When so assembled, the inner member 78 is then expanded into the position of Fig. 29 to bring the inner member into good running bearing fit with the balls and the balls into good running bearing fit with both raceways, and this expanding operation may be performed in the same manner and in the same mechanism as used in expanding the inner members of the previous forms. However, in this case, as the outer raceway 76 is a wider groove than the outer raceway in the previous forms, or that is, is formed on a portion of the surface of a sphere struck about the center of the opening in the outer member, this inner member 78 is free to rock laterally in the outer member and thus has self-aligning characteristics. However, means is provided to limit this rocking movement so that it will not be sufficient to carry the balls or antifriction rolling elements 77 out of the raceway 76. For this purpose the inner member at either one or both ends is provided with an annular shoulder 83 which may engage the shoulder 84 at the entrance to the opening through the outer member 75 and limit this lateral rocking movement when this inner member 78 is expanded in the assembling operation. This inner member when expanded is enlarged to the member 78a and opening 75 is enlarged to a larger diameter as indicated at 79a, the same as in the previous forms.

Figure 30:
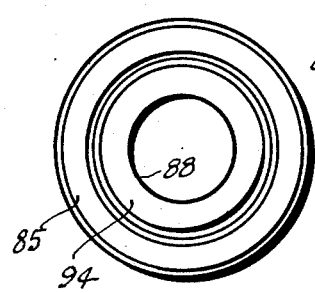
Fig. 30 is an end view of the elements of a self-aligning type of bearing showing them positioned to be assembled by this method, this view looking from the right of Fig. 31.
Figure 31:
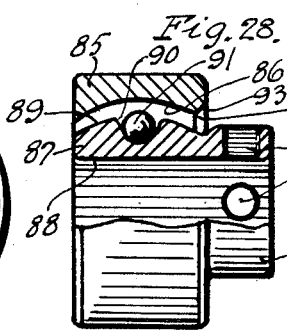
Fig. 31 is a partial side view and partial longitudinal section of the elements of this bearing showing them arranged prior to the expanding operation.
Figure 32:
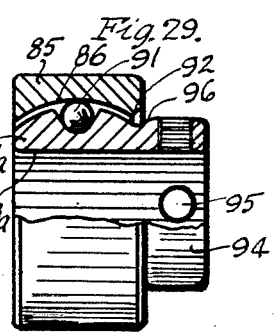
Fig. 32 is a similar partial side view and partial section showing this bearing completed after the expanding operation.

In Figs. 30 to 32 is shown a form of self-aligning bearing comprising a circular or cylindrical outer member 85 provided with a transverse opening in the wall of which is formed a raceway or groove 86 which, as in the form of Figs. 28 and 29, is formed as a portion of the surface of a sphere the center of which is the center of the opening, and this raceway surface extends substantially the whole width of the member 85. The inner member 87 is provided with a transverse or longitudinal bearing 88 and a curved outer surface 89 in which is formed an inner raceway 90. This is a groove of less width than that of the raceway 86, it being substantially the width of the rolling balls 91 so as to keep them in proper alignment. The outer or largest diameter of the member 87 and its raceway are such that this member and the balls 91 when in this raceway may be inserted through one entrance opening to the raceway 86 in the outer member, in this case the opening 92, which may also have an annular shoulder 93. In assembling the bearing, the parts are assembled as shown in Fig. 31, there being clearance between the balls 91 and the raceways, and then this inner member 87 is expanded to member 87a the same as in the previous forms, to the position of Fig. 32 to provide a good running bearing fit between the balls and the raceways 86 and 90, and it will be seen that as the raceway 86 is a relatively wide, transversely curved raceway in the form of a spherical surface, the inner member may be rocked laterally, thus providing a self-aligning bearing. In this form the inner member 87 is provided with an extension at one end forming a cylindrical hub or extension 94 projecting beyond one side of the outer member 86, which may be provided with one or more tapped openings 95 for receiving set screws or other means for securing this member to a shaft or other machine element extending through the opening in this member, and as in the other forms, when this member is expanded it is enlarged as shown at 87a and this opening 88 is expanded to a larger diameter 88a. This extension or hub 94 may also be used as the limiting means in cooperation with the shoulder 92 to limit the transverse rocking movement of the inner member 87 to prevent it rocking sufficiently with relation to the outer member to prevent the balls dropping from the bearing. This hub is provided with an inclined shoulder 96 to cooperate with the shoulder 92 for this purpose.

Figure 33:
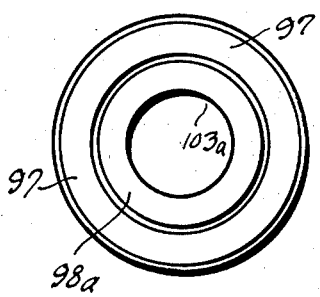
Fig. 33 is an end view of another form of self-aligning bearing assembled according to this method.
Figure 34:
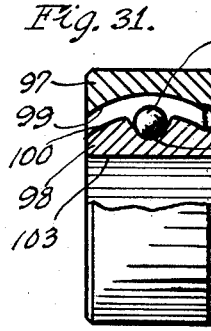
Fig. 34 is a partial side view and partial section of the elements of this bearing arranged preparatory to the expanding operation.
Figure 35:
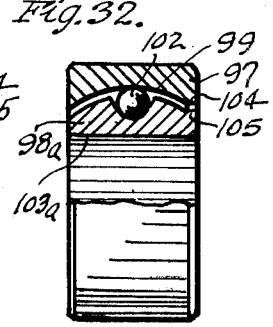
Fig. 35 is a partial side view and partial section of this bearing completed after the expanding operation.

In Figs. 33 to 35 is shown a type of self-aligning bearing comprising an outer or circular cylindrical member 97 in which is an inner member 98 of substantially the same width as the outer member. The outer member is provided with a transverse opening in the wall of which is a transversely curved raceway groove 99 formed as part of a spherical surface about a center in the center of the opening, and the inner member is provided with an outer curved surface 100 in which is formed a narrower raceway 101 of substantially the width of the balls 102 in the raceway. This inner member has a transverse plain bearing opening 103 therethrough and its outer diameter and the diameter of its raceway is such that it may be inserted in the opening in the outer member through one side entrance to this opening, as indicated at 104. In assembling the bearing the inner member and the balls are inserted in the opening in the outer member, and as the inner member is of smaller diameter there will be a clearance between the balls and the raceways, as shown in Fig. 34. Then this inner member 98 is expanded the same as described in connection with the other forms to the position of Fig. 35 to bring the parts to good running bearing relation between the balls and the two raceways in the inner and outer members. As the outer raceway is a relatively wide spherical surface it will permit the balls to have a lateral movement therein, permitting a lateral rocking movement between the inner member 98 and the outer member 97, the same as in the forms of Figs. 27 to 32, to provide a self-aligning bearing. To limit this relative rocking movement and thus prevent the balls dropping out of the bearing, cooperating shoulders 104 and 105 are provided on one end of both the opening in the outer member and the outer side respectively of the inner member at one end thereof, which are in a position to engage and limit relative rocking movement of the inner member. When the inner member 98 is expanded it is enlarged as indicated at 98a and the opening 103 is also increased in diameter as indicated at 103a.

In each of these forms of Figs. 27 to 35 the bearings may be heat-treated and hardened after assembly. Also in each of these forms the inner member is interlocked with the outer member by means of the rolling elements the same as in the other forms.

So far as applicant is aware, this method is the only one in which the bearing with unbroken raceways in both inner and outer members is capable of being assembled with a full complement or quota of the rolling elements, either balls or rollers. By full complement or quota is meant all the balls or other rolling elements that the raceways will hold with slight permissible clearance between them. The clearance generally used and considered proper is about one-thousandth of an inch between adjacent rolling elements, either balls or rollers, but this may be varied somewhat or to a limited degree. By an unbroken raceway is meant one without insertion notches or grooves to permit the insertion of the balls or rollers through such grooves to the raceways.

It will be seen from the above that in all forms of bearing shown the method of forming and assembling is the same; that the antifriction rolling elements, either the balls or the rollers, are assembled in either bearing member either with or without the cage separator, and then the inner bearing member assembled within the outer member in a reduced size is expanded to the size required for it in the finished bearing and to bring it to proper running bearing fit with the antifriction rolling elements, and to also locate them in proper running fit with the outer bearing member; that this operation may be accurately and effectively controlled, and that the finished bearing may or may not be heat-treated and hardened, as previously described. The finished bearing can be ground and finished to size as desired, and employed on shafts or with other machine elements the same as the standard antifriction bearing.

I claim:

1. A method of making antifriction bearings comprising forming an outer bearing member with a circular opening through it and a raceway in the wall of the opening; forming an inner bearing member of ductile, hardenable material with a circular outer wall and a second raceway in the outer wall, the outer wall having a diameter sufficiently small to permit the placing of rolling elements in one of the raceways and then placing the inner member in the opening with raceways and rolling elements aligned; placing rolling elements in one of the raceways; then placing the inner member in the opening with the raceways and rolling elements aligned; then radially expanding the inner bearing member sufficiently to interlock the inner and outer members through the rolling elements; and then subjecting the interlocked members and elements to a step which hardens the inner member.

2. A method as claimed in claim 1 in which a hole is provided through the inner member and the expansion step is accomplished by forcing a tapered punch through the hole.

3. A method as claimed in claim 2 in which the rolling elements are placed in the outer raceway.

4. A method of making antifriction bearings comprising forming an outer bearing member with a circular opening through it and a raceway in the wall of the opening; forming an inner bearing member of ductile material with a circular outer wall and a second raceway in the outer wall, the said outer wall having a diameter sufficiently small to permit the placing of rolling elements in one of the raceways and then placing the inner member in the opening with raceways and rolling elements aligned; placing rolling elements in one of the raceways; then placing the inner member in the opening with the raceways and rolling elements aligned; and then radially expanding the inner bearing member sufficiently to interlock the inner and outer members through the rolling elements.

5. A method as claimed in claim 4 in which the interlocked members and elements are subjected to heat treatment and the ductile, hardenable material is hardenable by heat treatment.

6. A method as claimed in claim 4 in which the interlocked members and elements are subjected to a step which hardens the inner member.

7. A method as claimed in claim 4 in which the rolling elements are placed in the outer raceway.

8. A method of making antifriction bearings, comprising forming an outer bearing member with a circular opening through it and a raceway in the wall of the opening, forming an inner bearing member with a circular outer wall and a second raceway in the outer wall, at least one of the members being of ductile material, the said outer wall having an outer diameter just small enough to permit the placing of rolling elements in one of the raceways and then placing the inner member in the opening with raceways and rolling elements aligned, placing the rolling elements in one of the raceways, then placing the inner member in the opening with raceways and rolling elements aligned, and then diminishing the space between the inner and outer members by deforming a member of ductile material sufficiently to interlock the inner and outer members through the rolling elements.

9. A method of making antifriction bearings, comprising forming an outer bearing member with a circular opening through it and a raceway in the wall of the opening, forming an inner bearing member with a circular outer wall and a second raceway in the outer wall, at least one of the members being of ductile, hardenable material, placing the inner and outer members in telescoped relation with rolling elements between them, diminishing the space between the inner and outer members by deforming a ductile, hardenable member sufficiently to interlock the inner and outer members through the rolling elements, and then subjecting the interlocked members and elements to a step which hardens a deformed member.

10. A method of making antifriction bearings, comprising forming an outer bearing member with a circular opening through it and a raceway in the wall of the opening, forming an inner bearing member of ductile, hardenable material with a circular outer wall and a second raceway in the outer wall, placing the inner and outer members in telescoped relation with rolling elements between them, diminishing the space between the inner and outer members by expanding the inner member sufficiently to interlock the inner and outer members through the rolling elements, and then subjecting the interlocked members and elements to a step which hardens the inner member.

11. A method of making antifriction bearings, comprising forming an outer bearing member with a circular opening through it and a raceway in the wall of the opening, forming an inner bearing member with a circular outer wall and a second raceway in the outer wall, at least one of the members being of ductile, hardenable material, the outer wall of the inner member having a diameter sufficiently small to permit the placing of rolling elements in one of the raceways and then placing the inner member in the opening with raceways and rolling elements aligned, placing rolling elements in one of the raceways, then placing the inner member in the opening with the raceways and rolling elements aligned, then diminishing the space between the inner and outer members by deforming a member of ductile, hardenable material sufficiently to interlock the inner and outer members through the rolling elements, and then subjecting the interlocked members and elements to a step which hardens a deformed member.

References Cited in the file of this patent
UNITED STATES PATENTS 1,080,169     Reed _____ Dec. 2, 1913